(12) United States Patent
Singh et al.

(10) Patent No.: US 11,658,833 B1
(45) Date of Patent: May 23, 2023

(54) SYSTEMS AND METHODS FOR CONDUCTING CRYPTOGRAPHICALLY SECURE ACTIONS IN PUBLIC, NON-PERMISSIONED BLOCKCHAINS USING BIFURCATED SELF-EXECUTING PROGRAMS

(71) Applicant: Citibank, N.A., New York, NY (US)

(72) Inventors: Shishir Singh, Staten Island, NY (US); Jonathan Miles Collin Rosenoer, West Port, CT (US); Andres Wolberg-Stok, Weston, FL (US); Biser Dimitrov, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/062,090

(22) Filed: Dec. 6, 2022

(51) Int. Cl.
*H04L 9/00* (2022.01)
*H04L 9/32* (2006.01)

(52) U.S. Cl.
CPC .............. *H04L 9/50* (2022.05); *H04L 9/3263* (2013.01)

(58) Field of Classification Search
CPC ............................... H04L 9/50; H04L 9/3263
USPC .......................................................... 380/28
See application file for complete search history.

(56) References Cited

U.S. PATENT DOCUMENTS

| | | | | |
|---|---|---|---|---|
| 8,380,817 B2 * | 2/2013 | Okada | ..................... | H04L 63/10 709/219 |
| 8,387,020 B1 * | 2/2013 | MacLachlan | ....... | G06F 11/3672 717/124 |
| 10,620,988 B2 * | 4/2020 | Lauderdale | ............. | G06F 8/458 |
| 11,133,942 B1 * | 9/2021 | Griffin | ................... | H04L 9/3255 |
| 11,410,136 B2 * | 8/2022 | Cook | ................... | G06Q 20/3829 |
| 2003/0007178 A1 * | 1/2003 | Jeyachandran | ........ | G06K 15/00 710/39 |
| 2004/0098454 A1 * | 5/2004 | Trapp | ..................... | H04L 63/08 709/204 |
| 2005/0204348 A1 * | 9/2005 | Horning | ................ | G06F 21/125 717/140 |
| 2006/0095918 A1 * | 5/2006 | Hirose | .................. | G06F 9/5038 718/104 |
| 2010/0313189 A1 * | 12/2010 | Beretta | ..................... | G06F 21/44 717/148 |
| 2014/0258998 A1 * | 9/2014 | Adl-Tabatabai | ........ | G06F 8/443 717/158 |
| 2018/0343114 A1 * | 11/2018 | Ben-Ari | ..................... | H04L 9/06 |
| 2019/0188706 A1 * | 6/2019 | McCurtis | ............... | G06Q 20/40 |
| 2020/0074470 A1 * | 3/2020 | Deshpande | ........ | G06Q 20/4016 |
| 2020/0349054 A1 * | 11/2020 | Dai | ..................... | G06F 11/3664 |
| 2021/0049288 A1 * | 2/2021 | Li | ......................... | H04L 9/3234 |
| 2021/0133182 A1 * | 5/2021 | Anderson | ............... | G06F 16/27 |
| 2021/0264547 A1 * | 8/2021 | Li | .............................. | G06F 9/54 |
| 2022/0334818 A1 * | 10/2022 | McFarland, Jr. | ... | H04L 41/0686 |
| 2022/0398149 A1 * | 12/2022 | McFarland, Jr. | ... | G06F 11/0751 |
| 2023/0035321 A1 * | 2/2023 | Vijayaraghavan | ... | G06Q 10/101 |

* cited by examiner

*Primary Examiner* — Dant B Shaifer Harriman
(74) *Attorney, Agent, or Firm* — Perkins Coie LLP

(57) ABSTRACT

Systems and methods for a bifurcated self-executing program that wraps a first self-executing program (e.g., a first smart contract) on a blockchain within a second self-executing program (e.g., a second smart contract), in which the second self-executing program enforces the requirement for particular security credentials/certificates. The bifurcated self-executing program comprises a single compiled self-executing program that combines the first self-executing program and the second self-executing program.

21 Claims, 5 Drawing Sheets

100

102 → contract Bifurcate1{ address certificate;    104
    address validator;

106 →
    uint public digital asset = 0;
    uint public signature = MPC;
    uint public no_ = 5;

struct Deal{
        uint characteristic;  108
    } modifier onlyBifurcate2(uint _index) {
        require( Characteristic[_index].approve == true,
        "Approval Execute Bifurcate2")}

152 → contract Bifurcate2{ address payable buyer;
　　　　address payable seller;

uint public no_of_units = 0;
154 →　uint public no_of_agreement = 0;
　　　　uint public no_of_price = 0;

156 → struct Deal{
　　　　　　　uint itemid;
　　　　　　　uint agreementid;
　　　　　　　string itemname;
　　　　　　　string itemaddress} modifier onlyBifurcate2(uint _index) {
　　　　　　　require( Bifurcate1.index].approve == true")}
158 →
　　　　}

SYSTEMS AND METHODS FOR CONDUCTING CRYPTOGRAPHICALLY SECURE ACTIONS IN PUBLIC, NON-PERMISSIONED BLOCKCHAINS USING BIFURCATED SELF-EXECUTING PROGRAMS

BACKGROUND

A blockchain is a decentralized ledger of transactions built upon a combination of cryptography techniques (e.g., secret-keys, hash functions, etc.), consensus mechanisms (e.g., Proof of Work, Proof of Stake, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

SUMMARY

Despite the technological breakthrough that blockchain and blockchain technology represents, practical implementations of blockchain technology have been hindered by several technical problems. For example, while the public availability of the information in the blockchain is a benefit in some applications, many practical applications require some level of privacy. For example, many practical applications may wish to benefit from the inherent security of blockchain technology, but nonetheless wish to do so in a private manner.

One solution to overcoming the aforementioned technical problem is through the use of a permissioned blockchain. For example, conventional permissioned blockchains require devices and/or accounts accessing the blockchains to have particular security credentials/certificates. Thus, only devices and/or accounts that have previously received permission may access the blockchain, conduct transactions, and view information on the blockchain. However, this limits the amount and number of devices and/or accounts that may use the blockchain as well as the devices and/or accounts that may take part in a transaction using the blockchain. For example, a significant limitation to a permissioned blockchain is that a self-executing program (e.g., "a smart contract") may only conduct transactions with devices and/or accounts that already have the required permissions. This is particularly problematic for conducting transactions with devices and/or accounts worldwide that may not have previously obtained the required permissions. Additionally, the permissioned blockchain allows information on the blockchain to be view by any other permissioned device and/or account; thus, it lacks a mechanism for enforcing more nuanced privacy.

In contrast, the systems and methods described herein obtain the security advantages of the blockchain as well as maintaining privacy, not only on a device and/or account level, but on a network-wide level. The system does so without requiring a permissioned blockchain, instead opting to use a bifurcated self-executing program. For example, a bifurcated self-executing program is a compiled self-executing program that wraps a first self-executing program (e.g., a first smart contract) on a blockchain within a second self-executing program (e.g., a second smart contract), in which the second self-executing program enforces the requirement for particular security credentials/certificates. By doing so, the system maintains the public nature and accessibility of the blockchain, but still allows for security to be maintained through requirements of particular security credentials/certificates for each bifurcated self-executing program. Additionally, it removes the need for devices and/or accounts to have previously obtained the required permissions to access the blockchain itself and instead enforces the requirement for particular security credentials/certificates only upon execution of the bifurcated self-executing program and in real-time.

The use of the bifurcated self-executing program also provides additional technical benefits. For example, by wrapping a first self-executing program (e.g., comprising the transaction details for the underlying transaction) within a second self-executing program (e.g., indicating specific rules), the second self-executing program may not only enforce requirements for particular security credentials/certificates, but may also enforce other requirements on the underlying transaction. These other requirements may include obfuscating specific details related to the transaction from publication on the blockchain (e.g., to preserve privacy), providing additional execution requirements (e.g., based on know-your-customer protocols, government regulations, etc.), and/or providing additional functionality (e.g., generating supplemental notifications, triggering other transactions, etc.). For example, one self-executing program of the bifurcated self-executing program may add a specific privacy requirement that causes an interest rate in a transaction to be hidden, but still allows for the transaction itself to be validated and recorded on the blockchain.

The use of the bifurcated self-executing program also provides yet additional technical benefit in that while it does not require a permissioned blockchain, it also does not require a layer two blockchain solution to achieve the aforementioned benefits. As such, the bifurcated self-executing program is a layer one blockchain solution that works within existing protocols and does not require additional architecture on top of an existing blockchain. Accordingly, the bifurcated self-executing program is highly flexible and scalable.

In some aspects, systems and methods for conducting cryptographically secure actions in public, non-permissioned blockchains using a layer one blockchain solution featuring bifurcated self-executing programs are described. For example, the system may receive a first request, at a bifurcated self-executing program, to perform a first blockchain action, wherein the first request has a first processing characteristic. In response to receiving the first request, the system may process the first request with a first self-executing program of the bifurcated self-executing program. The system may determine, based on the first self-executing program, whether the first processing characteristic corresponds to a predetermined processing characteristic. In response to determining that the first processing characteristic corresponds to the predetermined processing characteristic, the system may process the first request with a second self-executing program of the bifurcated self-executing program to perform the first blockchain action.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-B show an illustrative pseudocode for conducting secure blockchain actions in public, non-permissioned blockchains, in accordance with one or more embodiments.

DETAILED DESCRIPTION OF THE DRAWINGS

Figure 2:
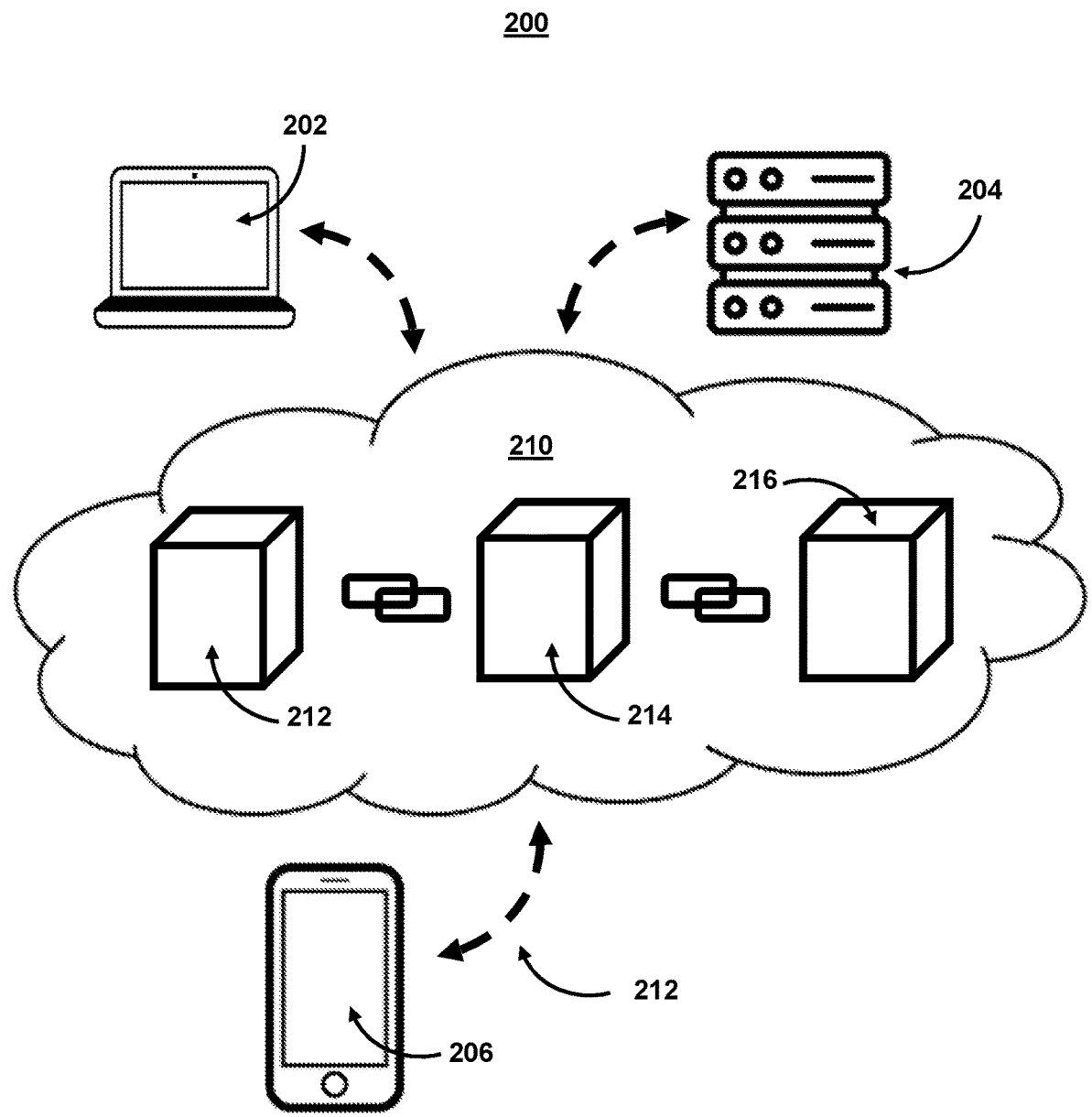
FIG. 2 shows an illustrative diagram of a blockchain network, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIGS. 1A-B show an illustrative pseudocode for conducting secure blockchain actions in public, non-permissioned blockchains, in accordance with one or more embodiments. For example, the systems and methods described herein obtain the security advantages of the blockchain as well as maintaining privacy, not only on a device and/or account level, but on a network-wide level. The system does so without requiring a permissioned blockchain, instead opting to use a bifurcated self-executing program.

As referred to herein, a "bifurcated self-executing program" may comprise a self-executing program that combines a plurality of individual self-executing programs. The bifurcated self-executing program may combine a plurality of individual self-executing programs all of which have been submitted to a common compiler. That is, the plurality of individual self-executing programs may all be simultaneously (e.g., as part of a single batch process) translated from a programming language's source code into machine code, bytecode, and/or another programming language that is suitable for execution on a blockchain. Additionally or alternatively, the bifurcated self-executing program may comprise a self-executing program that represents a combination of a plurality of individual self-executing programs that cannot be altered once the bifurcated self-executing program is deployed.

In some embodiments, the bifurcated self-executing program may comprise a self-executing program that is itself digitally wrapped by another self-executing program. For example, a bifurcated self-executing program may be a compiled self-executing program that wraps a first self-executing program (e.g., a first smart contract) on a blockchain within a second self-executing program (e.g., a second smart contract), in which the second self-executing program enforces the requirement for particular security credentials/certificates. Additionally or alternatively, one self-executing program in the bifurcated self-executing program may be backed 1:1 by another underlying self-executing program. By doing so, the system maintains the public nature and accessibility of the blockchain, but still allows for security to be maintained through requirements of particular security credentials/certificates for each bifurcated self-executing program. Additionally, it removes the need for devices and/or accounts to have previously obtained the required permissions to access the blockchain itself and instead enforces the requirement for particular security credentials/certificates only upon execution of the bifurcated self-executing program and in real-time.

The use of the bifurcated self-executing program also provides additional technical benefits. For example, by wrapping a first self-executing program (e.g., comprising the transaction details for the underlying transaction) within a second self-executing program (e.g., indicating specific rules), the second self-executing program may not only enforce requirements for particular security credentials/certificates, but may also enforce other requirements on the underlying transaction. These other requirements may include obfuscating specific details related to the transaction from publication on the blockchain (e.g., to preserve privacy), providing additional execution requirements (e.g., based on know-your-customer protocols, government regulations, etc.), and/or providing additional functionality (e.g., generating supplemental notifications, triggering other transactions, etc.). For example, one self-executing program of the bifurcated self-executing program may add a specific privacy requirement that causes an interest rate in a transaction to be hidden, but still allows for the transaction itself to be validated and recorded on the blockchain.

The use of the bifurcated self-executing program also provides yet additional technical benefit in that while it does not require a permissioned blockchain, it also does not require a layer two blockchain solution to achieve the aforementioned benefits. As such, the bifurcated self-executing program is a layer one blockchain solution (e.g., an on-chain networking solution that may process and complete blockchain actions on its own blockchain) that works within existing protocols and does not require additional architecture on top of an existing blockchain. Accordingly, the bifurcated self-executing program is highly flexible and scalable.

FIG. 1A includes pseudocode 100. Pseudocode 100 may represent one example of uncompiled code that may be used for generating a bifurcated self-executing program. For example, pseudocode 100 includes first self-executing program 102. First self-executing program 102 includes private variables 104 and public variables 106. For example, private variables 104 includes and public variables 106 may include various predetermined processing characteristic for the first self-executing program. The predetermined processing characteristic may represent processing characteristics of any request to execute the bifurcated self-executing program. For example, private variables 104 includes and public variables 106 may include requirements for a required security certificate, a specific request origination, a specific request validator, a specific digital asset, a specific signing procedure, a number of signatures, and/or other processing characteristics described herein.

As described herein, a "processing characteristic" may comprise any characteristic of a request and/or a blockchain action that distinguishes the request and/or blockchain action from another request and/or blockchain action. For example, a processing characteristic may be compared against a "predetermined processing characteristic" in a self-executing program. Based on the comparison, the self-executing program may determine whether or not to execute.

First self-executing program 102 also includes details 108. For example, first self-executing program 102 may create various details for first self-executing program 102 that may define additional processing characteristics and/or information related to processing characteristics that are required to be completed prior to the execution of first self-executing program 102. First self-executing program 102 also includes modifier 110. For example, modifier 110 indicates that if a given condition is not satisfied (e.g., the predetermined processing characteristic is not met), a function of first self-executing program 102 will not execute.

In some embodiments, self-executing program 102 may provide a privacy layer in addition to an additional security layer. For example, self-executing program 102 may comprise a second self-executing program (e.g., second self-executing program 152 (FIG. 1B)) that is digitally wrapped by self-executing program 102 in an encrypted state and/or in a state where details about the second self-executing program are not publicly available.

In some embodiments, the system may mask one or more details related to a self-executing program in the bifurcated self-executing programs. For example, the system may mask a payload of a self-executing program as well as a recipient. The system may provide this masking via hashing data in the self-executing program. For example, details may be completely obfuscated and represented by hash in one embodiment, which would completely obscure details in the self-executing programs (e.g., sender, recipient, etc.). The self-executing program may then invoke an agreed offline address and compute a local hash to match a hash in the self-executing program. Additionally or alternatively, a self-executing program may be encrypted using a public-private key pair as described herein. Additionally or alternatively, the system may use oracles to validate details from agreed off-chain or on-chain sources including same or other blockchains.

Additionally or alternatively, to mask recipient oracle constructs could use external input to be executed in one or more of the self-executing programs to perform blockchain actions (e.g., move asset to relevant blockchain accounts, obfuscating recipient identifiers (including by requesting recipients to create new accounts and/or addresses with no trace history). For example, the system may be used by users to move assets using random logic.

For example, self-executing program 102 may maintain the second self-executing program in an encrypted state through the use homomorphic encryption. As such, the second self-executing program would remain private in a public, non-permissioned blockchain, prior to self-executing program 102 being executed. Alternatively or additionally, the second self-executing program could be hosted external to the blockchain in a protected processing environment.

In such cases, any API ("Application Programming Interface") connections to a second self-executing program could be encrypted and secured, so that they could not be intercepted. It should be noted that the API may be applied consistently across a decentralized network. For example, the API may act as, or be integrated with, a blockchain oracle. A blockchain oracle is any device or entity that connects a deterministic blockchain with off-chain data. These oracles enter every data input through an external transaction. This way, we can be sure that the blockchain itself contains all of the information required to verify itself. Accordingly, embodiments described herein referring to APIs may equally be applied to oracles.

In some embodiments, the oracles may comprise a decentralized oracle. A decentralized oracle or decentralized oracle network is a group of independent blockchain oracles that provide data to a blockchain. Every independent node or oracle in the decentralized oracle network independently retrieves data from an off-chain source and brings it on-chain. The data is then aggregated so the system can come to a deterministic value of truth for that data point.

Data received and/or transmitted to one or more locations (e.g., an oracle) may be encrypted. Furthermore, the protected processing environment would prevent leakage of data. With respect to outputs, the output API path could also be protected. In some embodiments, a third self-executing program which is on the blockchain and processes the output from second self-executing program.

FIG. 1B includes pseudocode 150. Pseudocode 150 may represent one example of uncompiled code that may be used for generating a bifurcated self-executing program. For example, pseudocode 150 includes second self-executing program 152. Second self-executing program 152 includes private variables 154 and public variables 156. For example, private variables 154 includes and public variables 156 may include various processing characteristic for second self-executing program 150 such as a specific address for a buyer and/or a specific address for seller. Private variables 154 and public variables 156 may indicate various terms and rules for second self-executing program 152. For example, private variables 154 and public variables 156 may indicate specific unites, prices, etc. corresponding to second self-executing program 152.

Second self-executing program 152 also includes details 156. For example, second self-executing program 152 may create various details for second self-executing program 152. Second self-executing program 152 also includes modifier 158. For example, modifier 158 indicates that if a given condition is not satisfied (e.g., first self-executing program 102 has been executed), a function of second self-executing program 152 will not execute.

The system may further compile self-executing program 102 and self-executing program 152 into a bifurcated self-executing program. For example, the system may compile self-executing program 102 and self-executing program 152 into a bifurcated self-executing program by converting self-executing program 102 and self-executing program 152 into a single bytecode representation (e.g., the bifurcated self-executing program). The system may then deploy the compiled bifurcated self-executing program onto the blockchain. This single bytecode representation of the self-executing program 102 and self-executing program 152 is then stored on a blockchain. Additionally or alternatively, the single bytecode representation of the self-executing program 102 and self-executing program 152 may have a single address assigned to it.

FIG. 2 shows an illustrative diagram of a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 210.

As referred to herein, blockchain 210 may comprise a type of distributed ledger technology that consists of growing list of records, called blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214, but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain network 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to blockchain actions within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes network 210, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
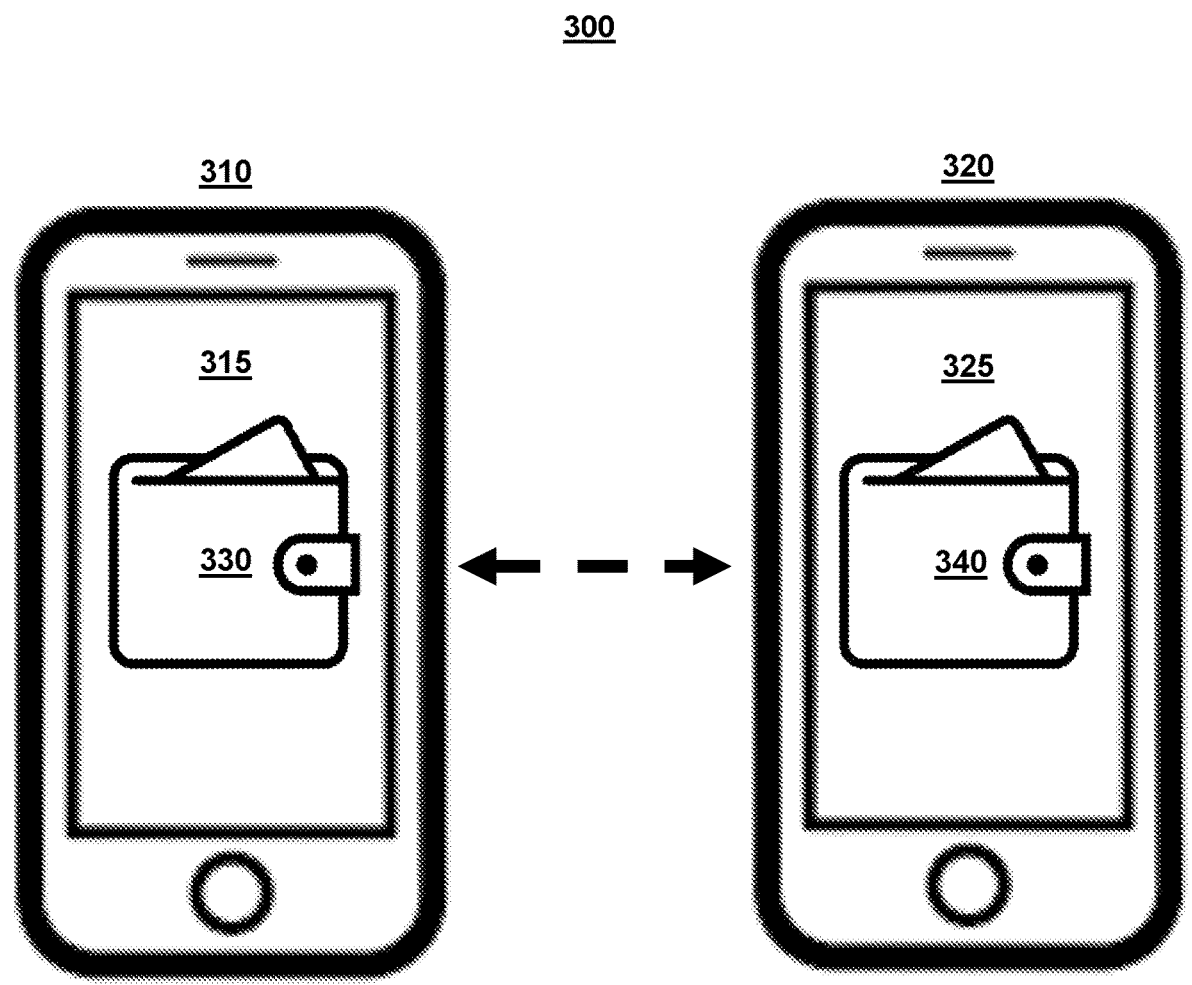
FIG. 3 shows an illustrative diagram for performing a blockchain action, in accordance with one or more embodiments.

FIG. 3 shows an illustrative diagram for conducting blockchain actions, in accordance with one or more embodiments. For example, the diagram presents various components that may be used to perform a blockchain action in some embodiments.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a smart contract or program stored on a blockchain. For example, a smart contract may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 325. As referred to herein, a "user interface" may comprise a mechanism for human-computer interaction and communication in a device and may include display screens, keyboards, a mouse, and the appearance of a desktop. For example, a user interface may comprise a way for a user interact with and/or access an application, website, and/or other program in order to interact with bifurcated self-executing programs. A user interface may display content related to blockchain actions. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more application program interfaces (e.g., APIs). For example, an API may be implemented on user device 310 and/or communicate with an API implemented on user device 320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate blockchain actions. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDoS) attacks. The API may use RESTful APIs as standard for external integration.

In some embodiments, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower-level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some embodiments, the cryptography-based, storage application may correspond to a key-based wallet or a smart contract wallet. For example, a key-based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiments, a cryptography-based, storage application may include, or have access to, a key-based wallet or a smart contract wallet. For example, the cryptography-based, storage application may comprise a digital or other construct (e.g., a reference, a pointer, a text on a blockchain, an address, etc.).

In some embodiments, to conduct a blockchain action, user device 310, user interface 315, and/or cryptography-based, storage application 330 may comprise, control, and/or have access to a private key and/or digital signature. For example, system 300 may use cryptographic systems for conducting blockchain actions such as those involving bifurcated self-executing programs. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 210 (FIG. 2)), and the blockchain action is completed. For example, to add the blockchain action to a blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 330) may allow a user device (e.g., user device 310) to share files, access, and/or perform a blockchain action with another user device (e.g., user device 320) and/or cryptography-based, storage application (e.g., cryptography-based, storage application 340). For example, the peer-to-peer architecture and decentralized nature allows blockchain actions to be conducted between the user devices, without the need of any intermediaries or central authorities.

Figure 4:
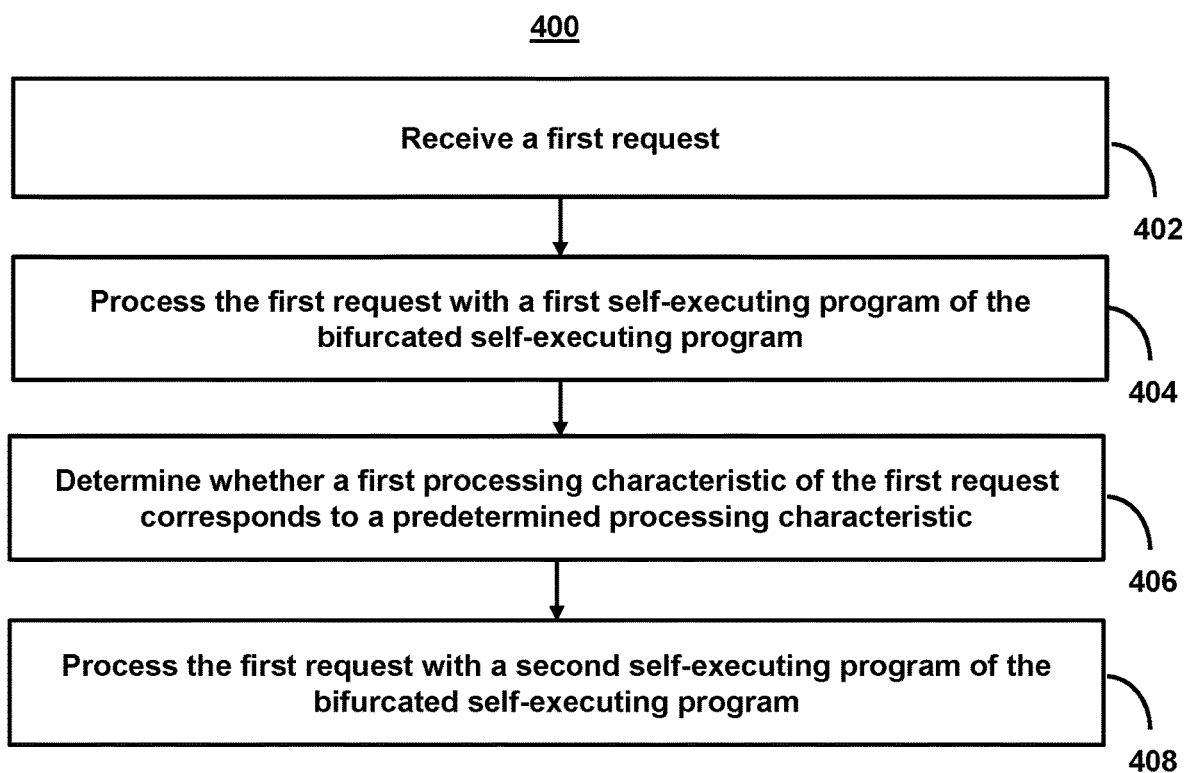
FIG. 4 shows a flowchart of the steps involved in conducting secure blockchain actions in public, non-permissioned blockchains, in accordance with one or more embodiments.

FIG. 4 shows a flowchart of the steps involved in conducting secure blockchain actions in public, non-permissioned blockchains, in accordance with one or more embodiments. For example, the system may use process 400 (e.g., as implemented on one or more system components described above) in order to conduct cryptographically secure actions in public, non-permissioned blockchains using a layer one blockchain solution featuring bifurcated self-executing programs that are compiled together.

At step 402, process 400 (e.g., using one or more components described above) receives a first request. For example, the system may receive a first request, at a bifurcated self-executing program, to perform a first blockchain action, wherein the first request has a first processing characteristic. For example, the system may receive a request to perform a transaction. The bifurcated self-executing program may comprise a self-executing program that is created based on the compiling of two other self-executing programs. For example, the system may receive a first uncompiled version of the first self-executing program. The system may receive a second uncompiled version of the second self-executing program. The system may compile the first uncompiled version of the first self-executing program and the second uncompiled version of the second self-executing program to generate the bifurcated self-executing program.

At step 404, process 400 (e.g., using one or more components described above) process the first request with a first self-executing program of the bifurcated self-executing program. For example, the system may, in response to receiving the first request, process the first request with a first self-executing program of the bifurcated self-executing program. The processing characteristic may comprise a parameter that must be satisfied prior to the bifurcated self-executing program performing the blockchain action (e.g., each action may have a specific rule, privacy requirement, government regulations, contract vetting status, etc. that is a prerequisite for executing the blockchain action using the bifurcated self-executing program). By doing so, the system may ensure that the prerequisite is achieved prior to the bifurcated self-executing program executing the blockchain action.

At step 406, process 400 (e.g., using one or more components described above) may determine whether a first processing characteristic of the first request corresponds to a predetermined processing characteristic. For example, the system may determine, based on the first self-executing program, whether the first processing characteristic corresponds to a predetermined processing characteristic. The system may use this to apply various prerequisites and/or criteria for executing the bifurcated self-executing program.

In some embodiments, the system may determine whether a first request has a required security certificate. For example, the system may use the first self-executing program to ensure that required security measures are met prior to executing a blockchain action of the second self-executing program. For example, a security certificate may be used as a means to provide the security level of a program. The security certificate may comprise a digital certificate such as a Secure Socket Layer (SSL) certificate, a specific public and/or private key, etc.

For example, the system may determine, based on the first processing characteristic, a security certificate for the first request. The system may then determine, based on the predetermined processing characteristic, a security certificate requirement for the bifurcated self-executing program. The system may then determine whether the security certificate corresponds to the security certificate requirement.

In some embodiments, the system may determine whether a first request has a specific request origination. For example, the system may use the first self-executing program to ensure that only requests from a particular entity (e.g., indicated by the request origination requirement) are able to execute the second self-executing program. For example, the request origination may include an entity from which the request was issued. In some cases, the system may identify the entity based on a specific address and/or unique identifier.

For example, the system may determine, based on the first processing characteristic, a request origination for the first request. The system may determine, based on the predetermined processing characteristic, a request origination requirement for the bifurcated self-executing program. The system may determine whether the request origination corresponds to the request origination requirement.

In some embodiments, the system may determine whether a first request has a specific request validator. For example, the system may use the first self-executing program to ensure that only requests that have been vetted and/or validated by a particular entity (e.g., indicated by the request validator requirement) are able to execute the second self-executing program. For example, a request validator may be a specific entity that investigates/validates what a program does through the higher-level language the program is written in, without having to read machine code. In some cases, the system may identify the request validator based on a specific address and/or unique identifier.

For example, the system may determine, based on the first processing characteristic, a request validator for the first request. The system may determine, based on the predetermined processing characteristic, a request validator requirement for the bifurcated self-executing program. The system may determine whether the request validator corresponds to the request validator requirement.

In some embodiments, the system may determine whether a first request has a specific request validation procedure. For example, the system may use the first self-executing program to ensure that only requests that have been vetted and/or validated using a particular request validation procedure (e.g., indicated by the request validation procedure requirement) are able to execute the second self-executing program. For example, a request validation procedure may investigate/validate what a program does through the higher-level language the program is written in, without having to read machine code.

For example, the system may determine, based on the first processing characteristic, a request testing protocol procedure for the first request. The system may determine, based on the predetermined processing characteristic, a request testing protocol requirement for the bifurcated self-executing program. The system may determine whether the request testing protocol corresponds to the request testing protocol requirement.

In some embodiments, the system may determine whether a first request has met a specific notification requirement. For example, the system may use the first self-executing program to ensure that only requests that have met these additional requirements (e.g., indicated by the predetermined processing characteristic) are able to execute the second self-executing program. For example, the notification requirement may require another entity to be notified of the first request and/or the first blockchain action prior to execution. Additionally or alternatively, the notification requirement may require other information such as a confirmation of the notification, an approval of the first blockchain action, etc. For example, a third party may have an option to perform the first blockchain action (e.g., a right of first refusal) prior to the first blockchain action being executed in response to the first request.

For example, the system may determine, based on the first processing characteristic, a notification requirement for the first request, wherein the notification requirement notifies an entity of the first request. The system may receive a confirmation that the notification requirement has been satisfied. The system may determine that the response satisfies the predetermined processing characteristic.

In some embodiments, the system may determine whether a first request has a specific protocol and/or supports a specific protocol. For example, the system may use the first self-executing program to ensure that only requests that support specific protocols (e.g., know-your-customer protocols, cross-chain protocol, etc.) are able to execute the second self-executing program.

For example, the system may determine, based on the first processing characteristic, a supported protocol for the first request. The system may determine, based on the predetermined processing characteristic, a protocol requirement for the bifurcated self-executing program. The system may determine whether the supported protocol corresponds to the protocol requirement.

In some embodiments, the system may determine whether a first request and/or the blockchain action is using a specific digital asset type (e.g., a specific cryptocurrency, token type, etc.). For example, the system may use the first self-executing program to ensure that only requests and/or blockchain actions using a particular digital asset type are able to execute the second self-executing program.

For example, the system may determine, based on the first processing characteristic, a digital asset type for the first request. The system may determine, based on the predetermined processing characteristic, a digital asset type requirement for the bifurcated self-executing program. The system may determine whether the digital asset type corresponds to the digital asset type requirement.

In some embodiments, the system may determine whether a first request and/or the blockchain action supports synthetic assets. For example, the system may use the first self-executing program to ensure that only requests and/or blockchain actions that support synthetic assets are able to execute the second self-executing program. By doing so, the system may ensure that the self-executing program does not fail (e.g., if the self-executing program relies on a synthetic asset).

For example, the system may determine, based on the first processing characteristic, a synthetic asset support for the first request. The system may determine, based on the predetermined processing characteristic, a synthetic asset support requirement for the bifurcated self-executing program. The system may determine whether the synthetic asset support corresponds to the synthetic asset support requirement.

In some embodiments, the system may determine whether a first request has a required ring signature. A ring signature is a type of digital signature that can be performed by any member of a set of users that each have keys. The system may use the first self-executing program to ensure that at least one of the users has approved the first request prior to executing the blockchain action of the second self-executing program.

For example, the system may determine, based on the first processing characteristic, a ring signature for the first request. The system may determine, based on the predetermined processing characteristic, a ring signature requirement for the bifurcated self-executing program. The system may determine whether the ring signature corresponds to the ring signature requirement.

In some embodiments, the system may determine whether a first request has a required Multi-Party Computation (MPC) signature. MPC enables multiple parties to evaluate a computation without revealing any of their private data to computing parties. This allows for transactions to be processed without the need for private keys eliminating the only possible attack vector that could exist in a decentralized custody model. The system may use the first self-executing program to ensure that request has been approved by the MPC signing protocol prior to executing the blockchain action of the second self-executing program. In should be noted that as describe above, communications with one or more of the self-executing programs may be encrypted to prevent data leakage. For example, signing parties, the number of signatures, and/or other details related to a signing protocol may be encrypted.

For example, the system may determine, based on the first processing characteristic, an MPC signature for the first request. The system may determine, based on the predetermined processing characteristic, an MPC signature requirement for the bifurcated self-executing program. The system may determine whether the MPC signature corresponds to the MPC signature requirement.

MPC involves the use of multiple parties, each of which holds respective private data that may be used to evaluate a computation without ever revealing any of the private data held by each party. For example, each party of the multiple parties may possess private data (e.g., $d_1$, $d_2$, . . . , $d_N$). Together, the parties may use their respective private data to compute a value of a public function: (e.g., $F(d_1, d_2, . . . , d_N)$). While the private data is used to compute a value based on the function, the private data is kept private during that process. In some embodiments, the bifurcated self-executing program may require a particular value that result from the MPC algorithm as a predetermined processing characteristic.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various cryptography-based digital repositories (or digital wallets). These digital wallets may have various configurations, typically categorized by whether the private key is held online or offline. For example, a hot storage wallet has a private key held online. A cold storage wallet has a private key held offline, and a hardware wallet has a private key held offline and on a physical device (e.g., a thumb drive). While holding a private key offline and/or tying the private key to a physical device is beneficial from a security perspective, this creates practical problems when attempting to conduct operations using the digital wallet. For example, to conduct an operation, a user must be able to access the private key from its offline location and/or the physical device. This is particularly burdensome for MPC-based key operations as it requires each user (e.g., corresponding to a respective private key) to be available at a given time. In some embodiments, the bifurcated self-executing program may require a particular storage type or storage configuration as a predetermined processing characteristic.

Furthermore, the use of a private key stored at an offline location and/or the physical device increases the risk that the offline location becomes inaccessible and/or the physical device is lost. In such cases, the digital wallet and any digital assets therein may be lost as well. This creates a critical flaw in MPC-based key operations as the loss of any one key may result in the loss of digital assets for all of the parties. The methods and systems described herein overcome this problem through the use of threshold signing requirements, separate approval and signing policies, independent key recovery mechanisms, and cohort/group key creation. More specifically, the methods and systems described herein alleviate flaws in the MPC-based key operations by creating MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline private partial key). In some embodiments, the bifurcated self-executing program may require a particular storage location (or digital wallet type) as a predetermined processing characteristic.

The MPC-based key operations maintain flexibility in the algorithm used. For example, the system may use online MPC algorithms such as the Gennaro and Goldfeder MPC algorithm and the Lindell et al. MPC algorithm. The online MPC algorithms have two limitations that restrict their use in conventional systems. First, they require users to wait for blockchain operations to undergo up to eight to twelve signatures rounds, which can create latency issues. Second, they require the use of online storage for private keys. Due to the use of partial private keys (e.g., comprises an online and offline pair), the system may use online MPC algorithms. Furthermore, given that the online requirement for the online MPC algorithms is satisfied by the online partial private key, the system may use the online MPC algorithms while maintaining the offline partial private key (e.g., increasing overall security). In some embodiments, the bifurcated self-executing program may require a particular MPC algorithm be used by specifying the algorithm or result (e.g., in a format corresponding to the algorithm) as a predetermined processing characteristic.

Additionally, the MPC-based key operations used by the system may include offline and/or online hybrid MPC algorithms. For example, the system may use MPC algorithms that include dynamic key refreshes (e.g., private key shares may be dynamically updated/modified at a given interval) and/or dynamic approval and/or signing policies. These dynamic policies are made possible by the online partial private key. Thus, the system introduces the enhanced security of dynamic systems, while still maintaining the security of offline systems (e.g., through the use of the offline partial private key).

Finally, the MPC-based key operations may use threshold key-signing policies in which only a threshold number of users (e.g., partial private keys corresponding to a user) are required. Upon determination by the system that the threshold is met, the system may allow a subsequent user (e.g., an online user) to finalize and perform a blockchain operation. As such, the system allows for the use of MPC-based key operations without requiring all parties to be online and/or available at the same time. In some embodiments, the bifurcated self-executing program may require a particular threshold as a predetermined processing characteristic.

At step 408, process 400 (e.g., using one or more components described above) may process the first request with a second self-executing program of the bifurcated self-executing program. For example, the system may, in response to determining that the first processing characteristic corresponds to the predetermined processing characteristic, process the first request with a second self-executing program of the bifurcated self-executing program to perform the first blockchain action.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for conducting cryptographically secure blockchain actions in public, non-permissioned blockchains using a layer one blockchain solution featuring bifurcated self-executing programs.
2. The method of any one of the preceding embodiments, further comprising: receiving a first request, at a bifurcated self-executing program, to perform a first blockchain action, wherein the first request has a first processing characteristic; in response to receiving the first request, processing the first request with a first self-executing program of the bifurcated self-executing program; determining, based on the first self-executing program, whether the first processing characteristic corresponds to a predetermined processing characteristic; and in response to determining that the first processing characteristic corresponds to the predetermined processing characteristic, processing the first request with a second self-executing program of the bifurcated self-executing program to perform the first blockchain action.
3. The method of any one of the preceding embodiments, wherein determining whether the first processing characteristic corresponds to the predetermined processing characteristic comprises: determining, based on the first processing characteristic, a security certificate for the first request; determining, based on the predetermined processing characteristic, a security certificate requirement for the bifurcated self-executing program; and determining whether the security certificate corresponds to the security certificate requirement.
4. The method of any one of the preceding embodiments, wherein determining whether the first processing characteristic corresponds to the predetermined processing characteristic comprises: determining, based on the first processing characteristic, a request origination for the first request; determining, based on the predetermined processing characteristic, a request origination requirement for the bifurcated self-executing program; and determining whether the request origination corresponds to the request origination requirement.
5. The method of any one of the preceding embodiments, wherein determining whether the first processing characteristic corresponds to the predetermined processing characteristic comprises: determining, based on the first processing characteristic, a request validator for the first request; determining, based on the predetermined processing characteristic, a request validator requirement for the bifurcated self-executing program; and determining whether the request validator corresponds to the request validator requirement.
6. The method of any one of the preceding embodiments, wherein determining whether the first processing characteristic corresponds to the predetermined processing characteristic comprises: determining, based on the first processing characteristic, a request validation procedure for the first request; determining, based on the predetermined processing characteristic, a request validation procedure requirement for the bifurcated self-executing program; and determining whether the request validation procedure corresponds to the request validation procedure requirement.
7. The method of any one of the preceding embodiments, wherein determining whether the first processing characteristic corresponds to the predetermined processing characteristic comprises: determining, based on the first processing characteristic, a request testing protocol procedure for the first request; determining, based on the predetermined processing characteristic, a request testing protocol requirement for the bifurcated self-executing program; and determining whether the request testing protocol corresponds to the request testing protocol requirement.
8. The method of any one of the preceding embodiments, wherein determining whether the first processing characteristic corresponds to the predetermined processing characteristic comprises: determining, based on the first processing characteristic, a notification requirement for the first request, wherein the notification requirement notifies an entity of the first request; receiving a confirmation that the notification requirement has been satisfied; and determining that the response satisfies the predetermined processing characteristic.
9. The method of any one of the preceding embodiments, wherein determining whether the first processing characteristic corresponds to the predetermined processing characteristic comprises: determining, based on the first processing characteristic, a supported protocol for the first request; determining, based on the predetermined processing characteristic, a protocol requirement for the bifurcated self-executing program; and determining whether the supported protocol corresponds to the protocol requirement.
10. The method of any one of the preceding embodiments, wherein determining whether the first processing characteristic corresponds to the predetermined processing characteristic comprises: determining, based on the first processing characteristic, a digital asset type for the first request; determining, based on the predetermined processing characteristic, a digital asset type requirement for the bifurcated self-executing program; and determining whether the digital asset type corresponds to the digital asset type requirement.

11. The method of any one of the preceding embodiments, wherein determining whether the first processing characteristic corresponds to the predetermined processing characteristic comprises: determining, based on the first processing characteristic, a synthetic asset support for the first request; determining, based on the predetermined processing characteristic, a synthetic asset support requirement for the bifurcated self-executing program; and determining whether the synthetic asset support corresponds to the synthetic asset support requirement.

12. The method of any one of the preceding embodiments, wherein determining whether the first processing characteristic corresponds to the predetermined processing characteristic comprises: determining, based on the first processing characteristic, a ring signature for the first request; determining, based on the predetermined processing characteristic, a ring signature requirement for the bifurcated self-executing program; and determining whether the ring signature corresponds to the ring signature requirement.

13. The method of any one of the preceding embodiments, wherein determining whether the first processing characteristic corresponds to the predetermined processing characteristic comprises: determining, based on the first processing characteristic, a Multi-Party Computation (MPC) signature for the first request; determining, based on the predetermined processing characteristic, a Multi-Party Computation (MPC) signature requirement for the bifurcated self-executing program; and determining whether the Multi-Party Computation (MPC) signature corresponds to the Multi-Party Computation (MPC) signature requirement.

14. The method of any one of the preceding embodiments, wherein the bifurcated self-executing program is generated based on: receiving a first uncompiled version of the first self-executing program; receiving a second uncompiled version of the second self-executing program; and compiling the first uncompiled version of the first self-executing program and the second uncompiled version of the second self-executing program to generate the bifurcated self-executing program.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for conducting cryptographically secure actions in public, non-permissioned blockchains using a layer one blockchain solution featuring bifurcated self-executing programs that are compiled together, the system comprising:
   a blockchain node for a cryptographically secure network, wherein the blockchain node comprises one or more processors; and
   a non-transitory computer-readable medium having instructions recorded thereon that when executed by the one or more processors causes operations comprising:
      receiving a first request, at a bifurcated self-executing program, to perform a first cryptographically secure blockchain action on the cryptographically secure network, wherein the first request has a first processing characteristic, and wherein the first processing characteristic comprises a variable defined in one or more lines of code of the bifurcated self-executing program;
      in response to receiving the first request, processing the first request with a first self-executing program of the bifurcated self-executing program, wherein the first self-executing program comprises a first function subset defined in the one or more lines of code of the bifurcated self-executing program;
      determining, based on the first self-executing program, whether the first processing characteristic corresponds to a predetermined processing characteristic, wherein determining whether the first processing characteristic corresponds to the predetermined processing characteristic comprises:
   determining, based on the first processing characteristic, a notification requirement for the first request, wherein the notification requirement notifies an entity of the first request;
   receiving a confirmation that the notification requirement has been satisfied; and
   determining that the response satisfies the predetermined processing characteristic; and
      in response to determining that the first processing characteristic corresponds to the predetermined processing characteristic, processing the first request with a second self-executing program of the bifurcated self-executing program to perform the first cryptographically secure blockchain action, wherein the second self-executing program comprises a second function subset defined in the one or more lines of code of the bifurcated self-executing program.

2. A method for conducting cryptographically secure blockchain actions in public, non-permissioned blockchains using a layer one blockchain solution featuring bifurcated self-executing programs that are compiled together, the method comprising:
   receiving a first request, at a bifurcated self-executing program, to perform a first blockchain action, wherein the first request has a first processing characteristic;
   in response to receiving the first request, processing the first request with a first self-executing program of the bifurcated self-executing program;
   determining, based on the first self-executing program, whether the first processing characteristic corresponds to a predetermined processing characteristic, wherein determining whether the first processing characteristic corresponds to the predetermined processing characteristic comprises:
   determining, based on the first processing characteristic, a notification requirement for the first request, wherein the notification requirement notifies an entity of the first request;
   receiving a confirmation that the notification requirement has been satisfied; and
   determining that the response satisfies the predetermined processing characteristic; and
   in response to determining that the first processing characteristic corresponds to the predetermined processing characteristic, processing the first request with a second self-executing program of the bifurcated self-executing program to perform the first blockchain action.

3. The method of claim 2, wherein determining whether the first processing characteristic corresponds to the predetermined processing characteristic comprises:
determining, based on the first processing characteristic, a security certificate for the first request;
determining, based on the predetermined processing characteristic, a security certificate requirement for the bifurcated self-executing program; and
determining whether the security certificate corresponds to the security certificate requirement.

4. The method of claim 2, wherein determining whether the first processing characteristic corresponds to the predetermined processing characteristic comprises:
determining, based on the first processing characteristic, a request origination for the first request;
determining, based on the predetermined processing characteristic, a request origination requirement for the bifurcated self-executing program; and
determining whether the request origination corresponds to the request origination requirement.

5. The method of claim 2, wherein determining whether the first processing characteristic corresponds to the predetermined processing characteristic comprises:
determining, based on the first processing characteristic, a request validator for the first request;
determining, based on the predetermined processing characteristic, a request validator requirement for the bifurcated self-executing program; and
determining whether the request validator corresponds to the request validator requirement.

6. The method of claim 2, wherein determining whether the first processing characteristic corresponds to the predetermined processing characteristic comprises:
determining, based on the first processing characteristic, a request validation procedure for the first request;
determining, based on the predetermined processing characteristic, a request validation procedure requirement for the bifurcated self-executing program; and
determining whether the request validation procedure corresponds to the request validation procedure requirement.

7. The method of claim 2, wherein determining whether the first processing characteristic corresponds to the predetermined processing characteristic comprises:
determining, based on the first processing characteristic, a request testing protocol procedure for the first request;
determining, based on the predetermined processing characteristic, a request testing protocol requirement for the bifurcated self-executing program; and
determining whether the request testing protocol procedure corresponds to the request testing protocol requirement.

8. The method of claim 2, wherein determining whether the first processing characteristic corresponds to the predetermined processing characteristic comprises:
determining, based on the first processing characteristic, a supported protocol for the first request;
determining, based on the predetermined processing characteristic, a protocol requirement for the bifurcated self-executing program; and
determining whether the supported protocol corresponds to the protocol requirement.

9. The method of claim 2, wherein determining whether the first processing characteristic corresponds to the predetermined processing characteristic comprises:
determining, based on the first processing characteristic, a digital asset type for the first request;
determining, based on the predetermined processing characteristic, a digital asset type requirement for the bifurcated self-executing program; and
determining whether the digital asset type corresponds to the digital asset type requirement.

10. The method of claim 2, wherein determining whether the first processing characteristic corresponds to the predetermined processing characteristic comprises:
determining, based on the first processing characteristic, a synthetic asset support for the first request;
determining, based on the predetermined processing characteristic, a synthetic asset support requirement for the bifurcated self-executing program; and
determining whether the synthetic asset support corresponds to the synthetic asset support requirement.

11. The method of claim 2, wherein determining whether the first processing characteristic corresponds to the predetermined processing characteristic comprises:
determining, based on the first processing characteristic, a ring signature for the first request;
determining, based on the predetermined processing characteristic, a ring signature requirement for the bifurcated self-executing program; and
determining whether the ring signature corresponds to the ring signature requirement.

12. The method of claim 2, wherein determining whether the first processing characteristic corresponds to the predetermined processing characteristic comprises:
determining, based on the first processing characteristic, a Multi-Party Computation (MPC) signature for the first request;
determining, based on the predetermined processing characteristic, a Multi-Party Computation (MPC) signature requirement for the bifurcated self-executing program; and
determining whether the Multi-Party Computation (MPC) signature corresponds to the Multi-Party Computation (MPC) signature requirement.

13. The method of claim 2, wherein the bifurcated self-executing program is generated based on:
receiving a first uncompiled version of the first self-executing program;
receiving a second uncompiled version of the second self-executing program; and
compiling the first uncompiled version of the first self-executing program and the second uncompiled version of the second self-executing program to generate the bifurcated self-executing program.

14. A non-transitory, computer-readable medium, comprising instructions that, when executed by one or more processors, cause operations comprising:
receiving a first request, at a bifurcated self-executing program, to perform a first blockchain action, wherein the first request has a first processing characteristic;
in response to receiving the first request, processing the first request with a first self-executing program of the bifurcated self-executing program;
determining, based on the first self-executing program, whether the first processing characteristic corresponds to a predetermined processing characteristic, wherein determining whether the first processing characteristic corresponds to the predetermined processing characteristic comprises:
determining, based on the first processing characteristic, a request origination for the first request determining, based on the predetermined processing characteristic, a request origination requirement for the bifurcated self-executing program; and
determining whether the request origination corresponds to the request origination requirement; and
in response to determining that the first processing characteristic corresponds to the predetermined processing characteristic, processing the first request with a second self-executing program of the bifurcated self-executing program to perform the first blockchain action.

15. The non-transitory, computer-readable medium of claim 14, wherein determining whether the first processing characteristic corresponds to the predetermined processing characteristic comprises:
   determining, based on the first processing characteristic, a security certificate for the first request;
   determining, based on the predetermined processing characteristic, a security certificate requirement for the bifurcated self-executing program; and
   determining whether the security certificate corresponds to the security certificate requirement.

16. The non-transitory, computer-readable medium of claim 14, wherein determining whether the first processing characteristic corresponds to the predetermined processing characteristic comprises:
   determining, based on the first processing characteristic, a request validator for the first request;
   determining, based on the predetermined processing characteristic, a request validator requirement for the bifurcated self-executing program; and
   determining whether the request validator corresponds to the request validator requirement.

17. The non-transitory, computer-readable medium of claim 14, wherein determining whether the first processing characteristic corresponds to the predetermined processing characteristic comprises:
   determining, based on the first processing characteristic, a request validation procedure for the first request;
   determining, based on the predetermined processing characteristic, a request validation procedure requirement for the bifurcated self-executing program; and
   determining whether the request validation procedure corresponds to the request validation procedure requirement.

18. The non-transitory, computer-readable medium of claim 14, wherein determining whether the first processing characteristic corresponds to the predetermined processing characteristic comprises:
   determining, based on the first processing characteristic, a request testing protocol procedure for the first request;
   determining, based on the predetermined processing characteristic, a request testing protocol requirement for the bifurcated self-executing program; and
   determining whether the request testing protocol procedure corresponds to the request testing protocol requirement.

19. A method for conducting cryptographically secure blockchain actions in public, non-permissioned blockchains using a layer one blockchain solution featuring bifurcated self-executing programs that are compiled together, the method comprising:
   receiving a first request, at a bifurcated self-executing program, to perform a first blockchain action, wherein the first request has a first processing characteristic;
   in response to receiving the first request, processing the first request with a first self-executing program of the bifurcated self-executing program;
   determining, based on the first self-executing program, whether the first processing characteristic corresponds to a predetermined processing characteristic, wherein determining whether the first processing characteristic corresponds to the predetermined processing characteristic comprises:
      determining, based on the first processing characteristic, a ring signature for the first request;
      determining, based on the predetermined processing characteristic, a ring signature requirement for the bifurcated self-executing program; and
      determining whether the ring signature corresponds to the ring signature requirement; and
   in response to determining that the first processing characteristic corresponds to the predetermined processing characteristic, processing the first request with a second self-executing program of the bifurcated self-executing program to perform the first blockchain action.

20. A method for conducting cryptographically secure blockchain actions in public, non-permissioned blockchains using a layer one blockchain solution featuring bifurcated self-executing programs that are compiled together, the method comprising:
   receiving a first request, at a bifurcated self-executing program, to perform a first blockchain action, wherein the first request has a first processing characteristic;
   in response to receiving the first request, processing the first request with a first self-executing program of the bifurcated self-executing program;
   determining, based on the first self-executing program, whether the first processing characteristic corresponds to a predetermined processing characteristic, wherein determining whether the first processing characteristic corresponds to the predetermined processing characteristic comprises:
      determining, based on the first processing characteristic, a Multi-Party Computation (MPC) signature for the first request;
      determining, based on the predetermined processing characteristic, a Multi-Party Computation (MPC) signature requirement for the bifurcated self-executing program; and
      determining whether the Multi-Party Computation (MPC) signature corresponds to the Multi-Party Computation (MPC) signature requirement; and
   in response to determining that the first processing characteristic corresponds to the predetermined processing characteristic, processing the first request with a second self-executing program of the bifurcated self-executing program to perform the first blockchain action.

21. A method for conducting cryptographically secure blockchain actions in public, non-permissioned blockchains using a layer one blockchain solution featuring bifurcated self-executing programs that are compiled together, the method comprising:
   receiving a first request, at a bifurcated self-executing program, to perform a first blockchain action, wherein the first request has a first processing characteristic, wherein the bifurcated self-executing program is generated based on:
      receiving a first uncompiled version of a first self-executing program;
      receiving a second uncompiled version of a second self-executing program; and
      compiling the first uncompiled version of the first self-executing program and the second uncompiled version of the second self-executing program to generate the bifurcated self-executing program;

in response to receiving the first request, processing the first request with the first self-executing program of the bifurcated self-executing program;

determining, based on the first self-executing program, whether the first processing characteristic corresponds to a predetermined processing characteristic; and in response to determining that the first processing characteristic corresponds to the predetermined processing characteristic, processing the first request with the second self-executing program of the bifurcated self-executing program to perform the first blockchain action.

* * * * *